(12) United States Patent
Fourney et al.

(10) Patent No.: US 7,284,653 B2
(45) Date of Patent: Oct. 23, 2007

(54) SORTER BELT CONVEYOR

(75) Inventors: Matthew L. Fourney, Laurel, MD (US); Christoph Lemm, Almere (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/277,314

(22) Filed: Mar. 23, 2006

(65) Prior Publication Data
US 2007/0221471 A1 Sep. 27, 2007

(51) Int. Cl.
*B65G 47/34* (2006.01)
*B65G 17/24* (2006.01)
(52) U.S. Cl. .................. 198/370.03; 198/779
(58) Field of Classification Search ............. 198/779, 198/370.03, 370.09
See application file for complete search history.

(56) References Cited
U.S. PATENT DOCUMENTS

| | | | |
|---|---|---|---|
| 2,566,417 A | 9/1951 | Holm | |
| 3,550,756 A | 12/1970 | Kornylak | |
| 3,608,713 A * | 9/1971 | Crosby et al. | 209/583 |
| 3,973,672 A | 8/1976 | Frost | |
| 4,039,074 A | 8/1977 | Maxted | |
| 4,143,756 A | 3/1979 | Chorlton | |
| 4,264,002 A | 4/1981 | Van Der Schie | |
| 5,092,447 A | 3/1992 | Wyman | |
| 5,101,958 A | 4/1992 | LeMay et al. | |
| 5,400,896 A | 3/1995 | Loomer | |
| 5,551,543 A | 9/1996 | Mattingly et al. | |
| 5,769,204 A | 6/1998 | Okada et al. | |
| 6,073,747 A | 6/2000 | Takino et al. | |
| 6,318,544 B1 | 11/2001 | O'Connor et al. | |
| 6,401,936 B1 | 6/2002 | Isaacs et al. | |
| 6,494,312 B2 * | 12/2002 | Costanzo | 198/779 |
| 6,571,937 B1 | 6/2003 | Costanzo et al. | |
| 6,648,125 B1 | 11/2003 | Bershadsky | |
| 6,681,922 B2 | 1/2004 | Corley et al. | |
| 6,758,323 B2 | 7/2004 | Costanzo | |
| 6,923,309 B2 | 8/2005 | Costanzo | |
| 6,968,941 B2 | 11/2005 | Fourney | |
| 2002/0108839 A1 | 8/2002 | Baker et al. | |
| 2005/0023105 A1 | 2/2005 | Costanzo et al. | |
| 2006/0249355 A1* | 11/2006 | Costanzo et al. | 198/779 |

FOREIGN PATENT DOCUMENTS

JP    03-088617 A    4/1991

* cited by examiner

*Primary Examiner*—Mark A Deuble
(74) *Attorney, Agent, or Firm*—James T. Cronvish

(57) ABSTRACT

Apparatus and methods using conveyor belts with activated diverting rollers to maintain the leading edge of a conveyed article while changing the direction of conveyance. A first conveyor belt advancing in a first direction abuts a second conveyor belt advancing in a second direction transverse to the first direction. Both conveyor belts have diverting rollers that rotate on axes oblique to the direction of conveyance. The diverting rollers of each are activated by rolling on an underlying bearing surface to rotate in the vicinity of the junction of the two conveyor belts. The diverting rollers in the first conveyor belt direct the article toward the second conveyor belt. The rollers in the second conveyor belt direct the article toward a side of the second conveyor belt. An article lying on both belts simultaneously rotates by the combined action of the two sets of diverting rollers acting on opposite ends of the article. The orientation of the rollers and their rotation maintain the leading edge of the article unchanged relative to the conveying direction after the transfer to the second conveyor belt.

11 Claims, 2 Drawing Sheets

SORTER BELT CONVEYOR

BACKGROUND

The invention relates generally to power-driven conveyors and, more particularly, to sorters or diverters constructed of conveyor belts having article-diverting rollers arranged to be rotatable on axes oblique to the direction of belt travel.

Sometimes it is required that articles conveyed in a first direction along one conveyor be diverted to one or more second conveyors arranged to advance the articles in a transverse second direction. Examples of these conveyors range from a simple right- or left-turn conveyor to a sorter with multiple parallel exit conveyors. Some applications, such as automatic baggage inspection or other applications in which article orientation is important, further require that the leading edge of a conveyed article be maintained as the article is diverted from the first conveyor to the second conveyor. If the difference between the first and second conveyance directions is small—for example, 30° or less— the leading edge of the diverted article will usually be maintained. But, if the difference between the conveyance directions is large—for example, 90°—the leading edge of the article on the first conveyor becomes a side edge after transferring to the second conveyor. That's why the exit conveyors on sorters typically branch off the main conveyor on angles of less than about 30°.

Thus, there is a need for a sorter or other diverting conveyor that can maintain the leading edge of a conveyed article as the conveyance direction changes from a first direction to a transverse second direction.

SUMMARY

This need and other needs are satisfied by a conveyor embodying features of the invention including a first conveyor belt advancing in a first direction and a second conveyor belt advancing in a second direction generally perpendicular to the first direction. The first conveyor belt extends in width from a first side to a second side and in thickness from a top to a bottom and advances in the first direction along a carryway from an upstream end to a downstream end. The second conveyor belt is positioned adjacent to the first conveyor belt to receive articles from the first conveyor belt. The second conveyor belt extends in width from a first side to a second side and in thickness from a top to a bottom and advances in the second direction along a carryway from an upstream end to a downstream end. Both the first conveyor belt and the second conveyor belt have rollers that protrude past the tops and bottoms. The rollers are retained in the first conveyor belt free to rotate on axes oblique to the first direction; the rollers are retained in the second conveyor belt free to rotate on axes oblique to the second direction. A first bearing surface underlies the first conveyor belt in the vicinity of the second conveyor belt on the carryway. As the first conveyor belt advances, the rollers roll along the first bearing surface and push articles conveyed atop the rollers toward the second side of the first conveyor belt. A second bearing surface underlies the second conveyor belt in the vicinity of the first conveyor belt on the carryway. As the second conveyor belt advances, the rollers roll along the second bearing surface and push articles conveyed atop the rollers toward the second side of the second conveyor belt.

Another aspect of the invention provides a conveyor for maintaining the leading edge of a conveyed article while changing the direction of conveyance. The conveyor comprises a first conveyor belt advancing downstream in a first conveyance direction and a second conveyor belt advancing downstream in a second conveyance direction transverse to the first direction. The first conveyor belt has article-supporting diverting rollers arranged to be rotatable on axes oblique to first conveyance direction; the second conveyor belt having article-supporting diverting rollers arranged to be rotatable on axes oblique to second conveyance direction. The second conveyor belt abuts the first conveyor belt to receive articles from the first conveyor belt. A first bearing surface engages the diverting rollers of the first conveyor belt to cause them to rotate on their axes to push a supported article across the first conveyor belt generally in the second conveyance direction. A second bearing surface engages the diverting rollers of the second conveyor belt to cause them to rotate on their axes to push a supported article toward a side of the second conveyor belt. An article simultaneously supported on the rotating diverting rollers of both the first and second advancing conveyor belts is rotated as it transfers from the first conveyor belt to the second conveyor belt so that the leading edge of the article is maintained as the direction of conveyance changes from the first conveyance direction to the second conveyance direction.

In yet another aspect of the invention, a method for maintaining the leading edge of a conveyed article while changing the direction of conveyance comprises: (a) conveying an article leading-edge first along a first conveyor belt advancing in a first direction and having diverting rollers arranged to be rotatable on axes oblique to the first direction; (b) contacting the diverting rollers of the first conveyor belt with bearing surfaces to cause the diverting rollers to rotate as the first conveyor belt advances to push the article in a second direction transverse to the first direction; (c) contacting the diverting rollers of a second conveyor belt abutting the first conveyor belt and advancing in the second direction with bearing surfaces to cause the diverting rollers of the second conveyor belt to rotate as the second conveyor belt advances to push the article toward a side of the second conveyor belt; and (d) transferring the article from the first conveyor belt to the second conveyor belt while the diverting rollers of both conveyor belts are rotating and simultaneously pushing the opposite ends of the article in different directions to cause the article to rotate during the transfer to maintain its leading edge as the conveyance direction changes from the first direction to the second direction.

BRIEF DESCRIPTION OF THE DRAWINGS

These aspects and features of the invention, as well as its advantages, are better understood by reference to the following description, appended claims, and accompanying drawings, in which:

DETAILED DESCRIPTION

Figure 1:
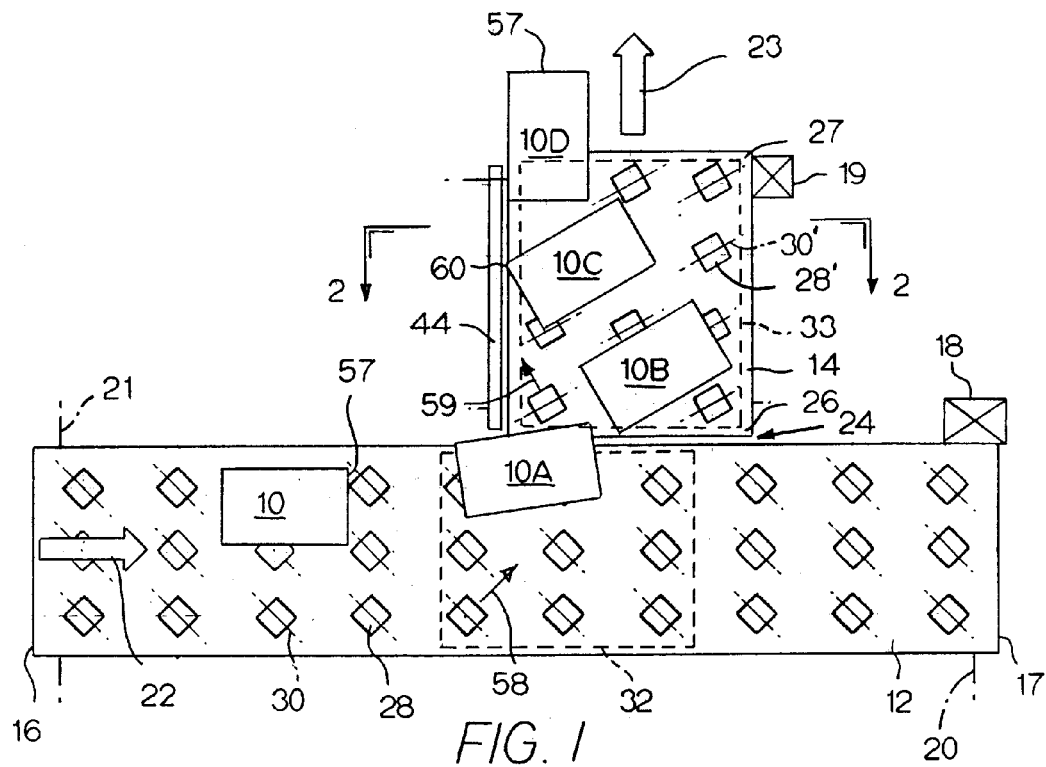
FIG. 1 is a top plan view of a portion of a left-turn conveyor embodying features of the invention.

FIG. 1 shows a conveyor system embodying features of the invention in which conveyed articles 10 make a left turn from a first conveyor belt 12 onto a second conveyor belt 14. The first conveyor belt extends along an upper carryway from an upstream end 16 to a downstream end 17. The belt is preferably in the form of an endless loop trained around shaft-mounted drive sprockets at the downstream end and shaft-mounted idle sprockets at the upstream end. A drive motor 18 drives the drive shaft (indicated by its axis 20) and drive sprockets to advance the conveyor belt in a first conveyance direction 22. The belt returns to the carryway around the idle shaft (indicated by its axis 21) and idle sprockets. The second conveyor belt 14, which abuts one side of the first conveyor belt across a small gap 24, is similarly advanced in a second conveyance direction 23 from an upstream end 26 to a downstream end 27 by a drive motor 19. In FIG. 1, the second direction 23 is shown perpendicular to the first direction 22. But the second conveyor belt could be arranged transverse to the first conveyor belt at angles other than 90°. Both conveyor belts have a plurality of article-supporting diverting rollers 28, 28' arranged to rotate on axes 30, 30' oblique to the direction of belt travel, or conveyance. The diverting rollers are caused to rotate in roller-activation regions 32, 33 formed along the carryways of the first and second conveyor belts in the vicinity of their junction. In the activation regions, the rotation of the rollers pushes conveyed articles in a downstream direction perpendicular to the rollers' axes.

Figure 2:
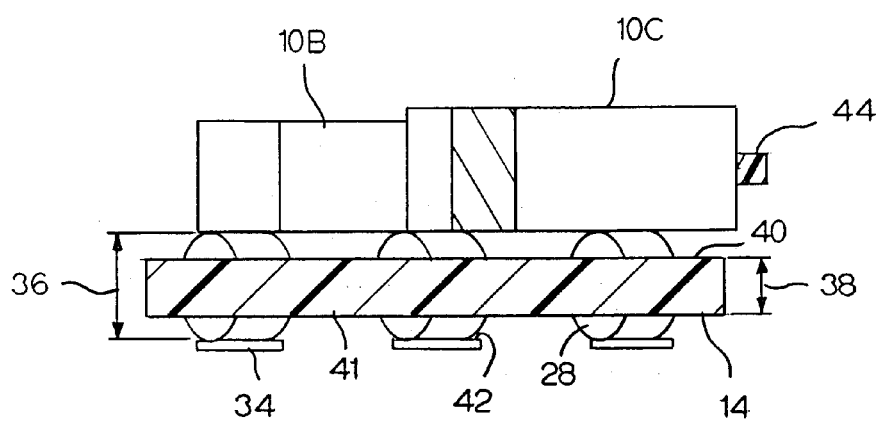
FIG. 2 is a cross section of the conveyor of FIG. 1 taken along lines 2-2 showing a bearing surface for the diverting rollers.

The operation of the activation region of the second conveyor belt is shown in more detail in FIG. 2. The belt 14 is supported on the carryway atop wearstrips 34. The diameter 36 of the diverting rollers 28' exceeds the thickness 38 of the belt between its top 40 and bottom 41. The salient portions of the rollers protruding past the bottom of the belt ride on bearing surfaces 42 on the underlying wearstrips as the belt advances in the second conveyance direction. Articles 10B and 10C, supported atop the salient portions of the rollers protruding past the top 40 of the belt, are urged toward a guide rail 44 at the side of the belt. In this example, the diverting rollers 28' are arranged on axes 30' oriented to exert a force to conveyed articles about 30° off the direction of belt travel 23.

Figure 3:
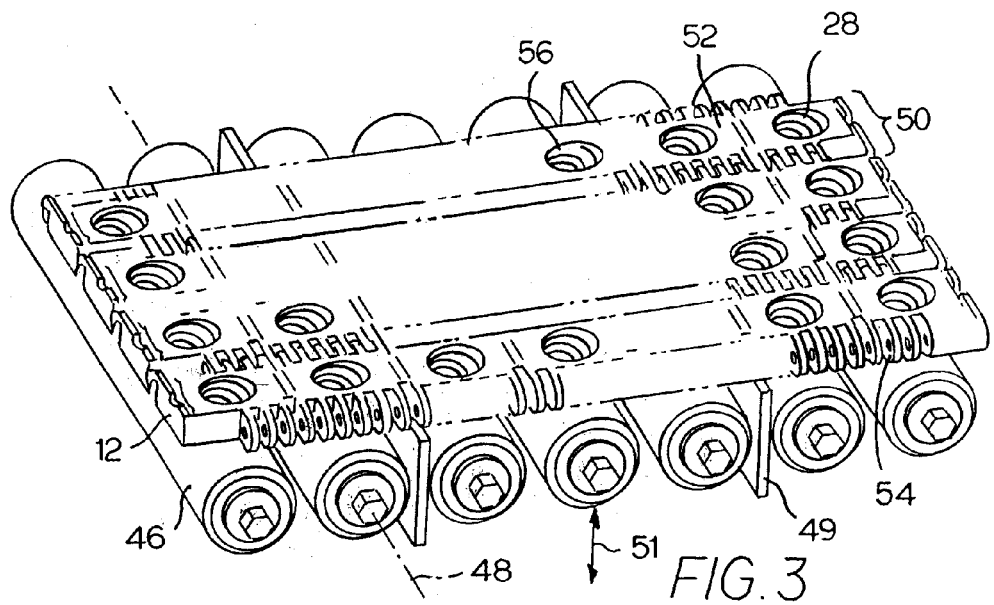
FIG. 3 is an axonometric view of a portion of a conveyor belt and another version of bearing surface usable in a conveyor as in FIG. 1.

Details of the operation of the roller-activation region 32 of the first conveyor belt 12 are shown in FIG. 3. The diverting rollers 28 in the first conveyor belt, in this example, are arranged to rotate on axes 30 oriented to exert a force on conveyed articles about 45° to about 60° off the direction of belt travel 22. To provide a more effective rolling bearing surface to the more severely oblique diverting rollers, a set of longitudinal rollers 46, rather than flat wearstrips, underlies the diverting rollers 28. The longitudinal rollers are free to rotate on their axes 48, which are aligned in the first conveyance direction. The roller-to-roller engagement reduces the sliding friction that would otherwise occur with 45° or 60° diverting rollers riding on the longitudinal flat bearing surfaces of wear strips or conveyor pans. Longitudinal supports 49 contacting the bottom of the belt provide further support and also allow the longitudinal rollers to be selectively moved into and out of contact with the diverting rollers, as indicated by arrow 51. The longitudinal rollers, in this example, or wear strips, in alternative versions of the conveyor may be raised and lowered, translated back and forth, or otherwise moved into and out of contact with the diverting rollers pneumatically, hydraulically, or electrically. The selective activation of the diverting rollers is useful in a multi-exit sorter as subsequently described with respect to FIG. 4.

The details of an exemplary conveyor belt are also shown in FIG. 3. Although the conveyor belt could be a flat belt or a metal belt, it is preferably a modular plastic conveyor belt, such as a Series 400 Angled Roller belt manufactured and sold by Intralox, L.L.C. of Harahan, La., U.S.A. The conveyor belt comprises rows 50 of one or more modules 52 joined by hinge pins received in lateral passageways formed by interleaved leading and trailing hinge eyes 54 of consecutive articulated rows. Each roller 28 is mounted in a cavity 56. A central bore in each roller admits an axle that spans the cavity. The roller rotates on the axle, which defines the roller's axis of rotation.

The progress of an article along the conveyor is described with reference to FIG. 1. The article 10, with a leading edge 57, is shown resting atop the diverting rollers 28 on the first conveyor belt 12 advancing in the first conveyance direction 22. The diverting rollers in the most upstream portion of the first conveyor belt do not necessarily have to rotate by rolling on bearing surfaces. In the vicinity of the second conveyor belt, however, the diverting rollers are activated in the roller-activation region 32. The activated rollers, rotating as indicated by arrow 58, push the article 10A off the side of the first conveyor belt and onto the second conveyor belt 14. The rollers 28' in the roller-activation region 33 of the second conveyor belt rotate in the direction indicated by arrow 59 to push the articles 10B, 10C toward the side guide 44. The different directions of roller rotation and belt advancement help rotate the article 10B spanning the gap 24 between the two belts. As a rear corner 60 of the article 10C frictionally contacts the side guide, the activated diverting rollers 28' in the second conveyor belt pivot the article into registration against the guide. The registered article 10D is then conveyed in the second conveying direction 23 with its leading edge 57 unchanged.

Figure 4:
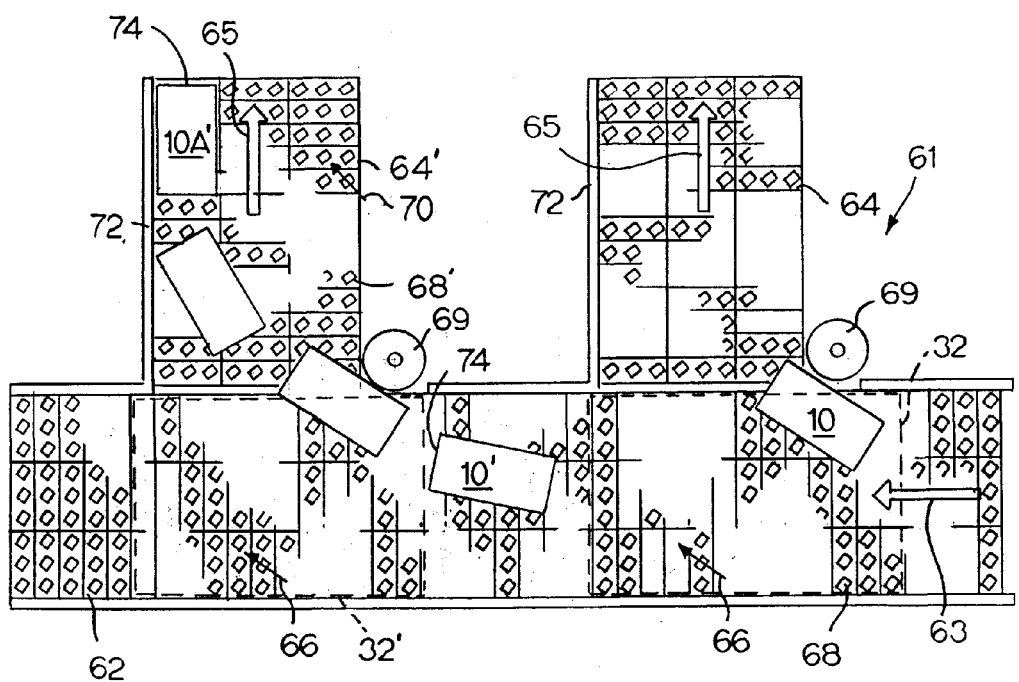
FIG. 4 is a top plan view of a portion of a multi-exit sorter embodying features of the invention.

This principle of operation also applies to the multi-exit sorter conveyor 62, a portion of which is shown in FIG. 4. In the sorter, a main conveyor belt 62 advances along a carryway in a first conveyance direction 63. The main conveyor belt has rollers 28 arranged to rotate on oblique axes. Two exit conveyor belts 64, 64' branch off from the main conveyor at a right angle, in this example. Each exit conveyor belt advances in a transverse second conveyance direction 65. For simplicity, only two exit conveyors are shown. In the vicinity of each exit conveyor belt, the main conveyor belt is underlain by bearing surfaces provided by wearstrips or longitudinal rollers to form diverting-roller activation regions 32, 32'. The diverting rollers on the exit conveyor belts are also activated by underlying bearing surfaces. To allow conveyed articles 10 to be selectively diverted to one or another exit conveyor belt, the underlying bearing surfaces defining the roller-activation regions are selectively moved into and out of contact with the diverting rollers 68 on the main conveyor belt 62. When the diverting rollers are activated, they rotate in a direction 66 to push the articles toward an exit conveyor belt. An article 10' destined for the second or a subsequent exit conveyor belt is allowed to bypass the first exit conveyor by the disengagement of the bearing surfaces from the diverting rollers in the first roller-activation region 32. The article 10' rests atop the deactivated rollers until it reaches the downstream roller-activation region 32'. If the article is destined for the second exit conveyor 64', the roller-activation region is selectively activated to rotate the diverting rollers and guide the article onto the second exit conveyor belt. Article-position sensors are used in conjunction with an intelligent controller (not shown) to control the activation of the bearing surfaces in the activation regions. Corner wheels 69 are positioned at the upstream junctions of the main conveyor belt and the exit conveyor belts to aid in the transfer of articles from the main conveyor belt onto the exit conveyor belts. The diverting rollers 68' on the exit conveyor belts are arranged to rotate in a direction 70 that pushes conveyed articles toward the side of the exit conveyor belt closer to the downstream end of the main conveyor. A side guide 72 registers the article 10A' with its leading edge 74 unchanged. This provides a more gradual turn than the left-turn conveyor of FIG. 1, in which the guide 44 is positioned closer to the upstream end of the first conveyor belt 12.

Thus, the invention provides apparatus and methods for changing the direction of a conveyed article without changing its leading edge relative to the direction in which it's being conveyed. The features of the invention exemplified in the left-hand diverter and the multi-exit sorter apply as well to other conveyor applications.

What is claimed is:

1. A conveyor comprising:
   a first conveyor belt extending in width from a first side to a second side and in thickness from a top to a bottom and advancing in a first direction along a carryway from an upstream end to a downstream end, the first conveyor belt including rollers protruding past the top and bottom and retained in the first conveyor belt free to rotate on axes oblique to the first direction;
   a second conveyor belt positioned adjacent the first conveyor belt to receive articles from the first conveyor belt, wherein the second conveyor belt extends in width from a first side to a second side and in thickness from a top to a bottom and advances along a carryway from an upstream end to a downstream end in a second direction generally perpendicular to the first direction, the second conveyor belt including rollers protruding past the top and bottom and retained in the second conveyor belt free to rotate on axes oblique to the second direction;
   a first bearing surface underlying the first conveyor belt in the vicinity of the second conveyor belt on the carryway along which the rollers roll as the first conveyor belt advances to push articles conveyed atop the rollers toward the second side of the first conveyor belt;
   a second bearing surface underlying the second conveyor belt in the vicinity of the first conveyor belt on the carryway along which the rollers roll as the second conveyor belt advances to push articles conveyed atop the rollers toward the second side of the second conveyor belt.

2. A conveyor as in claim 1 further comprising a guide positioned along the second side of the second conveyor belt to register articles conveyed atop the rollers on the second conveyor belt.

3. A conveyor as in claim 1 wherein the downstream end of the first conveyor belt abuts one of the first and second sides of the second conveyor belt.

4. A conveyor as in claim 1 wherein the upstream end of the second conveyor belt abuts the second side of the first conveyor belt.

5. A conveyor as in claim 1 wherein the second side of the second conveyor belt is closer to the upstream end of the first conveyor belt than to the downstream end.

6. A conveyor as in claim 1 wherein the first side of the second conveyor belt is closer to the upstream end of the first conveyor belt than to the downstream end.

7. A conveyor as in claim 1 wherein the first bearing surface is selectively actuatable into and out of contact with the rollers in the first conveyor belt.

8. A conveyor as in claim 1 further comprising a plurality of second conveyor belts arranged in parallel with their upstream ends abutting the second side of the first conveyor belt and wherein the first bearing surface is selectively actuatable into and out of contact with the rollers in the first conveyor belt in the vicinity of each of the second conveyor belts.

9. A conveyor for maintaining the leading edge of a conveyed article while changing the direction of conveyance, the conveyor comprising:
   a first conveyor belt advancing downstream in a first conveyance direction and having article-supporting diverting rollers arranged to be rotatable on axes oblique to first conveyance direction;
   a second conveyor belt abutting the first conveyor belt to receive articles from the first conveyor belt, wherein the second conveyor belt advances downstream in a second conveyance direction transverse to the first direction, the second conveyor belt having article-supporting diverting rollers arranged to be rotatable on axes oblique to second conveyance direction;
   a first bearing surface engaging the diverting rollers of the first conveyor belt to cause the diverting rollers to rotate on their axes to push a supported article across the first conveyor belt generally in the second conveyance direction;
   a second bearing surface engaging the diverting rollers of the second conveyor belt to cause the diverting rollers to rotate on their axes to push a supported article toward a side of the second conveyor belt;
   wherein an article simultaneously supported on the rotating diverting rollers of both the first and second advancing conveyor belts is rotated as the article transfers from the first conveyor belt to the second conveyor belt so that the leading edge of the article is maintained as the direction of conveyance changes from the first conveyance direction to the second conveyance direction.

10. A conveyor as in claim 9 further comprising a guide positioned along the side of the second conveyor belt to register articles conveyed atop the diverting rollers on the second conveyor belt.

11. A method for maintaining the leading edge of a conveyed article while changing the direction of conveyance, the method comprising:
    conveying an article leading-edge first along a first conveyor belt advancing in a first direction and having diverting rollers arranged to be rotatable on axes oblique to the first direction;
    contacting the diverting rollers of the first conveyor belt with bearing surfaces to cause the diverting rollers to rotate as the first conveyor belt advances to push the article in a second direction transverse to the first direction;
    contacting the diverting rollers of a second conveyor belt abutting the first conveyor belt and advancing in the second direction with bearing surfaces to cause the diverting rollers of the second conveyor belt to rotate as the second conveyor belt advances to push the article toward a side of the second conveyor belt;
    transferring the article from the first conveyor belt to the second conveyor belt while the diverting rollers of both conveyor belts are rotating and simultaneously pushing the opposite ends of the article in different directions to cause the article to rotate during the transfer to maintain its leading edge as the conveyance direction changes from the first direction to the second direction.

* * * * *